(12) United States Patent
Vera Alarcon

(10) Patent No.: US 9,765,250 B2
(45) Date of Patent: Sep. 19, 2017

(54) NON-AZEOTROPIC FLUID MIXURE FOR AIR CONDITIONING DEVICES

(71) Applicant: PSK Research, LLC, Wyoming, DE (US)

(72) Inventor: Sebastian Vera Alarcon, El Puerto de Santa Maria (ES)

(73) Assignee: PSK Research, LLC, Wilmington, DE (US)

( * ) Notice: Subject to any disclaimer, the term of this patent is extended or adjusted under 35 U.S.C. 154(b) by 0 days.

(21) Appl. No.: 14/547,162

(22) Filed: Nov. 19, 2014

(65) Prior Publication Data

US 2016/0137894 A1    May 19, 2016

(51) Int. Cl.
*C09K 5/04*        (2006.01)

(52) U.S. Cl.
CPC .......... *C09K 5/045* (2013.01); *C09K 2205/12* (2013.01); *C09K 2205/34* (2013.01)

(58) Field of Classification Search
CPC .... C09K 5/045; C09K 5/042; C09K 2205/12; C09K 2205/126; C09K 2205/34
See application file for complete search history.

(56) References Cited

U.S. PATENT DOCUMENTS

| | | | | |
|---|---|---|---|---|
| 6,508,950 | B1* | 1/2003 | Lim | C09K 5/045 252/67 |
| 6,526,764 | B1* | 3/2003 | Singh | C09K 5/045 252/67 |
| 6,783,691 | B1* | 8/2004 | Bivens | C07C 19/08 252/67 |
| 2015/0353801 | A1* | 12/2015 | Champie | C09K 5/045 62/502 |

* cited by examiner

*Primary Examiner* — John Hardee
(74) *Attorney, Agent, or Firm* — Lucas & Mercanti, LLP

(57) ABSTRACT

A non-azeotropic fluid mixture for air conditioning apparatus characterized because the mixture comprises the following refrigerant fluids (gases) in given proportions:
  2-Methylpropane (Isobutane) CH(CH3)3 (R-600a),
  Pentafluoroethane (R-125),
  Tetrafluoroethane (R-134a)
  Difluoromethane (R-32).
The composition of the mixture contains at least one polymerization inhibitor agent (hydroquinone, benzotriazole, dimethyl-t-butylphenol).

3 Claims, 1 Drawing Sheet

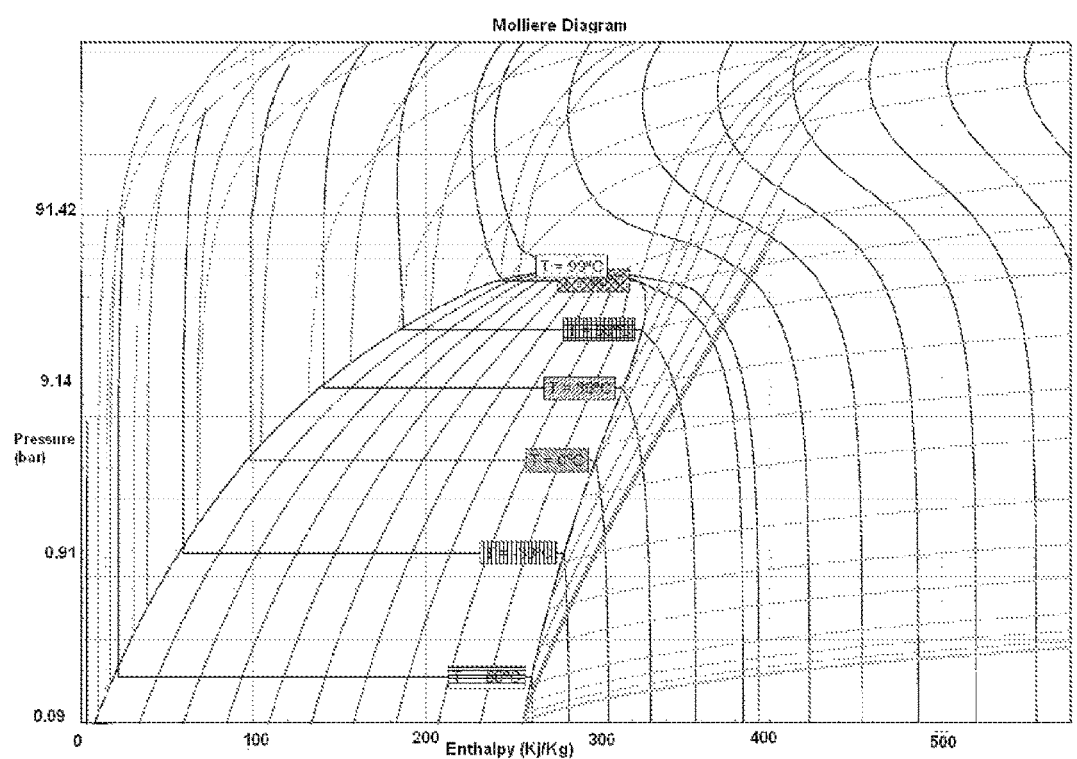

NON-AZEOTROPIC FLUID MIXURE FOR AIR CONDITIONING DEVICES

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION
TECHNICAL FIELD

The field of the invention is that of the chemical industry, and more specifically the gas production industry and the industry for the manufacture of air conditioning devices.

DESCRIPTION OF THE RELATED ART

There are many precedents in the use of gases for various purposes.

There are also some precedents in connection with fluid mixture for the air conditioning industry.

Examples of these precedents may be reflected in the patent document.

47 REFRIGERANT COMPOSITION.

| Publication number: | ES2354043 T3 | (9 Mar. 2011) |
| Also published as: | EP1765953 A1 | (28 Mar. 2007) |
| | EP1765953 B1 | (6 Oct. 2010) |
| | WO2005083028 A1 | (9 Sep. 2005) |

Applicant: RPL HOLDINGS LIMITED (GB)
CIP: CO9K5/04 (2006.01)
Abstract: A refrigerant composition consisting in weight essentially of: 53.2 R134a at 39% R125 45-55% 0.6 isopentane at 1% 0.6 butane at 3% 0.6 isobutane at 2%. It does indeed offer substantial differences from the composition of the invention proposed.
75 COMPOSITION OF A WORKING FLUID FOR A REFRIGERATING MACHINE.

| Publication number: | ES2082148 T3 | (16 Mar. 1996) |
| Also published as: | EP0475751 A1 | (18 Mar. 1992) |
| | EP0475751 B1 | (6 Dec. 1995) |

Applicant: KAO CORPORATION (JP)
CIP: CO9K5/00 (2006.01)
This invention describes a composition for the operating fluid of a refrigerating machine comprising: a hydrofluorocarbon and an ester formed between a neopentilpoliol and a branched, saturated aliphatic monocarboxylic acid, with carbon number from 7-9. The composition of the working fluid in this invention is excellent in terms of its compatibility, lubrication, thermal stability and insulating properties.

The characteristics of this invention are however new and are not all anticipated in unified form, for the reasons set out below.

The field of this invention refers to use of the mixture in the invention as refrigerant in air conditioning systems both for the production of cold and as heat pump.

That mixture is applied to single cycle refrigerating circuits with a steam compression system.

The mixture performance has been evaluated according to the refrigerating load, discharge temperature, the power used by the compressor and the COP, EER, SCOP and SEER.

The composition in the invention has a cyclic yield which is enhanced in comparison with conventional refrigerants available, such as R-410A or R-407C, when used both to produce cold and in a heat pump.

After multiple trials, the refrigerant mixture which is the subject of this invention was placed in the highest energy classification, A+++.

The current trend in the field of refrigerants is to create less or zero environmental impact, so the elimination of chlorine from its composition yields a zero value for ODP (Ozone Depletion Potential), while working for maximum reduction of GWP (Global Warning Potential), the most noble being natural refrigerants (NH3, Co2) or hydrocarbons (HC), and finally HFC of low GWP, such as the mixture in this invention, its GDP index=0 and a very low GWP.

There is not at this time, as authoritative value on the market, a composition such as that in this invention which is so energy-efficient compared with other existing mixtures, producing energy savings of between 40% and 60%, contributing indirectly to a reduction of CO2 in electricity production.

A further factor be considered that existing less pollutant refrigerants have relatively high toxicity and inflammability values, making them less safe to handle.

The mixture proposed in this invention is both thermally and chemically stable under severe conditions of both temperature and pressure.

The AEL (Allowable Exposure Limit) value is 1000 ppm (8 hours TWA).

Thus it is classified among High Security refrigerants.

The inventor is unaware of any forerunner which incorporates the provisions of this invention nor the benefits bestowed by such provisions.

BRIEF SUMMARY OF THE INVENTION

The invention promoted refers to a non-azeotropic fluid mixture for air conditioning devices, a fluid mixture used in such devices as the means for cooling them.

To define the major parameters of this invention, exhaustive research was carried out on the ratios of the proportion of the mixture, resulting in physical-chemical and thermodynamic properties included in FIG. 1.

More specifically, the invention considers the mixture in terms of different proportions of the following refrigerant fluids (gases):

2-Methylpropane (Isobutane) CH(CH3)3 (R-600a),
Pentafluoroethane (R-125),
Tetrafluoroethane (R-134a)
Difluoromethane (R-32), The mixture's composition includes at least one polymerisation inhibiting agent (hydroquinone, benzotriazole, dimethyl-t-butylphenol, etc.).

That is all for use in air conditioning and refrigerating equipment, both domestically and industrially and in automobiles, with its cold and heat applications.

BRIEF DESCRIPTION OF THE DRAWINGS

FIG. 1 is an enthalpy-entropy chart, also known as the h-chart or Mollier diagram. The displayed chart covers a pressure range of 0.09-91.42 bar, and an enthalpy measured in (kj/kg) up to 500

DETAILED DESCRIPTION OF THE INVENTION

Description of the Preferred Embodiment

The invention proposed refers to a non-azeotropic fluid mixture for air conditioning devices, a fluid mixture employed in such apparatus as a means to cool them.

The cyclic performance of the composition in the invention is enhanced compared with conventional refrigerants available and, in synthesis, comprises the following gases in the proportions indicated:

0.5-5% 2-Methylpropane (Isobutane) CH(CH3)3, commercially known as (R-600a),
1%-10% Pentafluoroethane, commercially known as (R-125)
75%-95% Tetrafluoroethane, commercially known as (R-134a),
2%-20% Difluoromethane commercially known as (R-32),
0.03-3 parts of weight of polymerization inhibitor for every 100 parts of the previous mixture The main polymerization inhibitor agents are hydroquinone, benzotriazole or dimethyl-t-butylphenol.

The mixture obtained by these means is a compound, chemically stable non-azeotropic ternary mixture with good thermodynamic properties, low environmental impact and very low toxicity.

The mixture is classified as A1 group L1 of High Security refrigerants and with a temperature glide of 7.2° C.

Because it is not miscible with mineral oils, it must be used with polyester oils (POE).

To avoid fractionation, it must be loaded during the liquid phase.

The mixture toxicity is very low, even after exposure. The AEL value (Allowable Exposure Limit) is 1000 ppm. (8 hours TWA).

The following table shows a result of its Physical Properties.

| PHYSICAL PROPERTIES | | |
|---|---|---|
| Molecular point | (g/mol) | 93.4 |
| Boiling temperature (at 1.013 bar) | (° C.) | −30.8 |
| Freezing point | (° C.) | −102 |
| Critical temperature | (° C.) | 100.3 |
| Critical pressure | (abs bar) | |
| Critical density | (kg/m3) | 514 |
| Liquid density (25° C.) | (kg/m3) | 1180 |
| Liquid density (−25° C.) | (kg/m3) | 1307 |
| Saturated vapour density | (kg/m3) | 4.9 |
| Vapour pressure (25° C.) | (bar abs) | 7.3 |
| Vapour pressure (−25° C.) | (bar abs) | 2.4 |
| Boiling point vaporisation heat | (kj/kg) | 223 |
| Specific liquid heat (25° C.) (1.013 bar) | (kj/kg k) | 1.48 |
| Specific vapour heat (25° C.) (1.013 bar) | (kj/kg k) | 0.84 |
| Thermal conductibility of the liquid (25° C.) | (W/mk) | 0.085 |
| Thermal conductibility of the vapour (1 atm.) | (W/mk) | 0.0138 |
| Liquid viscosity (25° C.) | (cP) | 0.204 |
| Surface pressure (25° C.) | (mN/m) | 8.04 |
| Solubility with water (25° C. at 1.013 bar) | (wt %) | 0.15 |
| Refrigerant volumetric capacity (25° C.) | (kg/m3) | 1196.45 |
| Inflammability limit in air at 1 atm. | (% vol) | none |
| Toxicity (AEL) | (ppm) | 1000 |
| PCA (GWP) | — | 1263 |
| ODP | — | 0 |
| sEER | A+++ | 15.38 |

The mixture obtained by these means as refrigerant fluid will be used in both domestic and industrial air conditioning equipment, and in automobiles and also as refrigeration, and has an energy classification of A+++.

This is a mixture whose refrigerant composition does not damage the ozone layer, has little global warming effect, very low inflammability, very low toxicity and which is very energy-efficient.

Having sufficiently described the nature of the invention and how to put it into practice, it must be recorded that the foregoing specifications, also shown in the attached drawings, may be modified in detail provided that this does not, alter their fundamental principles established in the previous paragraphs and summarised in the following claims.

The invention claimed is:

1. A non-azeotropic fluid mixture for air conditioning devices, comprising:
    a mixture of the following gases:
    0.5%-5% 2-Methylpropane (Isobutane) CH(CH$_3$)$_3$, commercially known as (R-600a),
    1%-3% Pentafluoroethane, commercially known as (R-125),
    93%-95% 1,1,1,2-Tetrafluoroethane, commercially known as (R-134a), and
    2%-3% Difluoromethane, commercially known as (R-32),
    wherein the mixture of gases further comprises 0.03-3 parts in weight of a polymerisation inhibitor for each 100 parts of the mixture of gases, and
    wherein the non-azeotropic fluid mixture is not miscible with mineral oils and it is used with polyester oils.

2. The non-azeotropic fluid mixture as set forth in claim 1, wherein the polymerisation inhibitor is principally hydroquinone, benzotriazole or dimethyl-t-butylphenol.

3. The non-azeotropic fluid mixture as set forth in claim 1, wherein the energy classification of the mixture obtained by these means as refrigerant fluid is A+++.

* * * * *